Nov. 16, 1937.  D. A. DONNAN  2,099,053

RAKE ATTACHMENT

Filed Jan. 11, 1937

Inventor

Dan A. Donnan,

By Clarence A. O'Brien and
Hyman Berman
Attorney.

Patented Nov. 16, 1937

2,099,053

UNITED STATES PATENT OFFICE 2,099,053

RAKE ATTACHMENT

Dan A. Donnan, Fennimore, Wis.

Application January 11, 1937, Serial No. 120,068

1 Claim. (Cl. 55—10)

This invention relates to rakes of the hand type, and an object of the invention is to provide a device which may be readily attached to the rake and which will increase the efficiency of the rake.

In accordance with the present invention a member is provided so that it may be readily demountably attached to the tine equipped head of the rake in a manner to cooperate with the tine to facilitate the raking of old dead grass without injury to the good living grass.

Briefly the invention consists in the provision of a member preferably of elastic material and transversely curved which may be disposed in operative position to the tines of the rake in a quick and efficient manner and easily removed therefrom when not desired for further use.

The invention together with its objects and advantages will be best understood from a study of the following description taken in connection with the accompanying drawing wherein.

Figure 1:
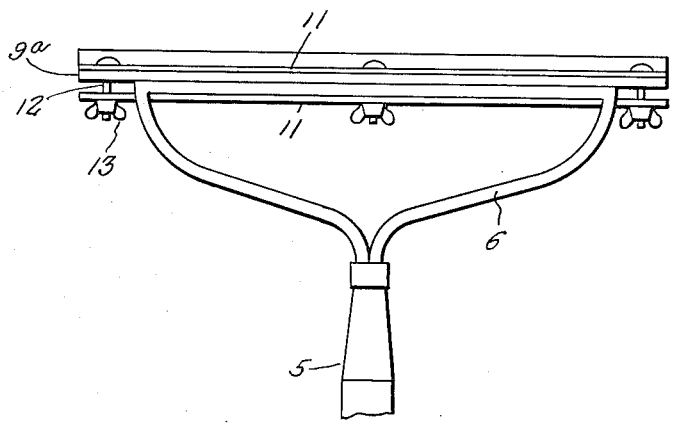
Figure 1 is a top plan view of a rake head equipped with the invention.
Figure 2:
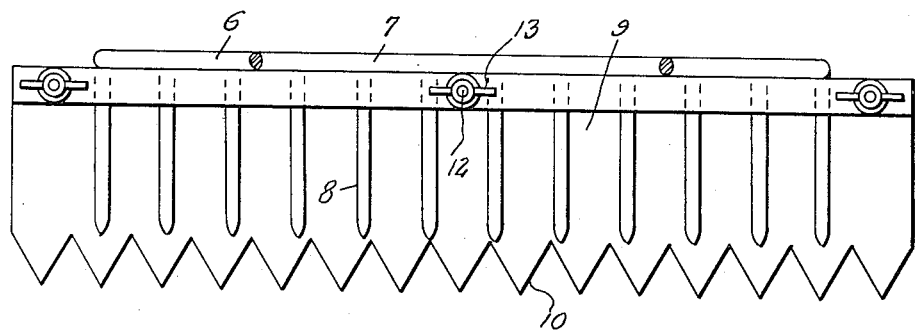
Figure 2 is a rear elevational view of the rake head showing the attachment as applied thereto.

Referring to the drawing by reference numerals it will be seen that 5 indicates generally a portion of a handle of a conventional rake, and 6 the head of the rake.

Head 6 is formed in any usual or conventional manner and includes among other parts the cross bar 7 to which is secured in any suitable manner as for example, by being integral therewith the tines 8.

Figure 3:
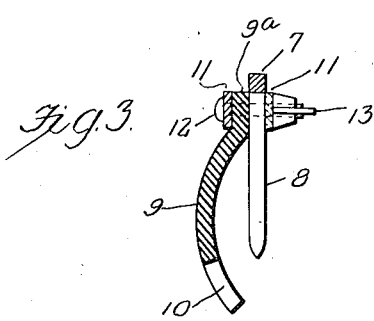
Figure 3 is a fragmentary detail sectional view further illustrating the application of the invention.

The attachment per se comprises an oblong block or body member 9, the same in the present instance being preferably formed of vulcanized rubber. Block 9 is transversely curved as clearly shown in Figure 3 and has one longitudinal edge thereof serrated to provide teeth 10.

Adjacent its opposite longitudinal edge the member 9 is flat and forms a flange adapted to be placed flatly against the tines 8 at the front side of the head.

A pair of elongated clamping plates 11 are provided, together with bolts 12 and wing nuts 13 for the purpose of detachably securing the attachment to the rake head.

As shown in the drawings the edge 9a of the member 9 is clamped between the tines 8 and one plate 11 while the other plate 11 is disposed against the rear faces of the tines 8. Bolts 12 pass through alined openings in the plates 11 and in the flange part 9a of the member 9 preferably one adjacent each of the respective opposite ends of the attachment, and one intermediate the ends of said attachment, and when the nuts 13 are screwed home the device will be rigidly secured in place on the rake head in a manner not to interfere with the use of the tine but on the other hand to assist the tine in gathering the dead grass, weeds and the like.

It will be further appreciated that in actual practice the concave face of the member 9 is presented toward the tine 8 and the device in use will have a tendency to create a suction action when the rake is drawn toward the operator which will draw toward it all the old dead grass and thus supplement the action of the tines when the rake is in use.

Having thus described the invention what is claimed as new is:

A lawn rake attachment embodying an oblong resilient plate transversely curved, said plate having an edge formed to lie against the teeth of the rake and provided with bolt holes, said plate also having a second edge provided with V-shaped teeth, a clamping plate disposed facially against the flange of the attachment plate and a second clamping plate disposed facially against the tines at the side thereof opposite to the attachment plate, said clamping plates being provided with bolt holes alining with the first mentioned bolt holes, and bolts extending through the alined bolt holes equipped with nuts for positively securing the attachment in position.

DAN A. DONNAN.